(12) United States Patent
Wang

(10) Patent No.: US 12,058,280 B2
(45) Date of Patent: Aug. 6, 2024

(54) DISPLAY DEVICE

(71) Applicant: Wuhan China Star Optoelectronics Semiconductor Display Technology Co., Ltd., Hubei (CN)

(72) Inventor: Wenqiang Wang, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 324 days.

(21) Appl. No.: 17/615,158

(22) PCT Filed: Nov. 15, 2021

(86) PCT No.: PCT/CN2021/130717
§ 371 (c)(1),
(2) Date: Nov. 30, 2021

(87) PCT Pub. No.: WO2023/035405
PCT Pub. Date: Mar. 16, 2023

(65) Prior Publication Data
US 2023/0231942 A1    Jul. 20, 2023

(30) Foreign Application Priority Data

Sep. 7, 2021 (CN) .......................... 202111044269.6

(51) Int. Cl.
*H04M 1/02* (2006.01)
(52) U.S. Cl.
CPC ....... *H04M 1/0268* (2013.01); *H04M 1/0216* (2013.01)

(58) Field of Classification Search
CPC ... H04M 1/0268; H04M 1/0216; G09F 9/301; G09F 9/33
USPC .......................................................... 455/566
See application file for complete search history.

(56) References Cited

U.S. PATENT DOCUMENTS

| 11,137,801 B2 * | 10/2021 | Park ...................... G06F 1/1681 |
| 2012/0002360 A1 | 1/2012 | Seo et al. |
| 2012/0033354 A1 | 2/2012 | Huang |
| 2020/0267851 A1 | 8/2020 | Hou et al. |
| 2020/0274088 A1 * | 8/2020 | Luo ...................... H10K 50/841 |

(Continued)

FOREIGN PATENT DOCUMENTS

| CN | 103582340 | 2/2014 |
| CN | 104851365 | 8/2015 |

(Continued)

*Primary Examiner* — Eugene Yun

(57) ABSTRACT

A display device is provided, which includes a first folding frame, a second folding frame, a first support plate, a second support plate, a pretension assembly, and a flexible display screen. The second folding frame rotates relative to the first folding frame. The first support plate is disposed on the first folding frame and the second folding frame and includes a bending structure. The bending structure is connected to the first folding frame and the second folding frame. The second support plate is disposed on at least one side of the first support plate. The pretension assembly is connected to the second support plate. The flexible display screen is disposed on the first support plate and the at least one second support plate and is connected to the second support plate. The pretension assembly is configured to provide a pretension force to the flexible display screen.

13 Claims, 8 Drawing Sheets

(56) References Cited

U.S. PATENT DOCUMENTS

2021/0026410 A1    1/2021  Park
2022/0311847 A1*   9/2022  Zhao ..................... G06F 1/1681

FOREIGN PATENT DOCUMENTS

| | | |
|---|---|---|
| CN | 107102692 | 8/2017 |
| CN | 108520702 | 9/2018 |
| CN | 110853532 | 2/2020 |
| CN | 111047988 | 4/2020 |
| CN | 111179762 | 5/2020 |
| CN | 111225088 | 6/2020 |
| CN | 210925299 | 7/2020 |
| CN | 111681548 | 9/2020 |
| CN | 111866223 | 10/2020 |
| CN | 112037658 | 12/2020 |
| CN | 112509465 | 3/2021 |
| CN | 112509466 | 3/2021 |
| CN | 112837621 | 5/2021 |
| CN | 113066377 | 7/2021 |
| CN | 113241008 | 8/2021 |
| CN | 113345332 | 9/2021 |

* cited by examiner

DISPLAY DEVICE

RELATED APPLICATIONS

This application is a National Phase of PCT Patent Application No. PCT/CN2021/130717 having International filing date of Nov. 15, 2021, which claims the benefit of priority of Chinese Patent Application No. 202111044269.6 filed on Sep. 7, 2021. The contents of the above applications are all incorporated by reference as if fully set forth herein in their entirety.

FIELD AND BACKGROUND OF THE INVENTION

The present application relates to a field of display technology, particularly to a display device having a pretension assembly.

With increasing maturity of organic light emitting diode (OLED) display technology, commercial market of foldable mobile phones and foldable laptops are greatly promoted. Foldable display products are greatly favored by consumers. However, a problem of fold marks has always been one of main reasons affecting further expansion of foldable mobile phone market. Currently, no reasonable solution for how to effectively reduce the problem of the fold marks of the OLED screens on mobile phones has been found.

Factors that cause the problem of the fold marks on OLED displays are complicated, which mainly include the following reasons. Due to unreasonable hinge designs of foldable display devices, such as an unreasonable hinge design of folding mobile phones, actions of naturally folded and unfolded cannot be completed on screens during use processes of the mobile phones. Furthermore, motion tracks of behaviors such as pulling, squeezing, etc. exist between middle frame structures and screens of foldable mobile phones. If a number of bending times reaches a certain number, microscopic damage between laminated materials of the OLED modules can be accumulated to a certain extent, which becomes into visible fold marks for human eyes. In addition, due to pursuit of designs of thinness and lightness for current foldable mobile phones, more strict requirements are placed on a bending radius of the OLED screens, i.e., the smaller the bending radius is, the more conducive to the designs of thinness and lightness for overall devices is. Therefore, under a condition of a smaller bending radius, local deformation in bending regions of the OLED modules is often the most serious. When local strain exceeds a limit plastic strain value of module material layers, an irreversible plastic deformation is formed. As the number of bending increases, the plastic strain of film layers gradually becomes into macroscopic fold marks.

Therefore, a display device is needed to solve a problem existing in the prior art.

A technical problem of current foldable display devices is that when bending regions of the current foldable display devices are bent a plurality of times, irreversible plastic deformation is formed, so fold marks are formed.

SUMMARY OF THE INVENTION

In order to solve the aforesaid technical problem, one purpose of the present application is to provide a display device to reduce a chance of forming fold marks after flexible displays are bent a plurality of times to improve flatness of bending regions of screens, thereby enhancing overall user experience of the flexible displays.

On the basis of the aforesaid purpose, the present application provides a display device, including a first folding frame, a second folding frame, a first support plate, at least one second support plate, at least one pretension assembly, and a flexible display screen. The second folding frame rotates relative to the first folding frame. The first support plate is disposed on the first folding frame and the second folding frame and includes a bending structure. The bending structure is connected to the first folding frame and the second folding frame. At least one second support plate is disposed on at least one side of the first support plate. At least one pretension assembly is connected to the second support plate. The flexible display screen is disposed on the first support plate and the at least one second support plate and is connected to the second support plate. The at least one pretension assembly is configured to provide a pretension force to the flexible display screen.

In one embodiment of the display device of the present application, the at least one pretension assembly is disposed between the first folding frame and the at least one second support plate and/or is disposed between the second folding frame and the at least one second support plate.

In one embodiment of the display device of the present application, the at least one pretension assembly includes at least one elastic element, and the at least one elastic element generates the pretension force.

In one embodiment of the display device of the present application, the at least one elastic element is connected to the at least one second support plate through at least one connection element, and the at least one connection element penetrates the at least one first via hole.

In one embodiment of the display device of the present application, the flexible display screen includes a cover window and a plurality of functional layers, the cover window covers a top surface and a lateral surface of the plurality of functional layers and a bottom surface of the at least one second support plate, and the cover window is connected to the at least one pretension assembly.

In one embodiment of the display device of the present application, at least one second via hole is defined in the cover window, and the at least one second via hole communicate to the at least one first via hole, and the at least one connection element penetrates the at least one first via hole and the at least one second via hole.

In one embodiment of the display device of the present application, the at least one connection element is a pin nail, the at least one elastic element is a spring, a first portion and a second portion defined in the at least one first via hole, a width and the first portion is less than a top portion of the at least one connection element, and a width of the second portion is greater than the top portion of the at least one connection element.

In one embodiment of the display device of the present application, a shape of the at least one first via hole is two overlapped circles or a triangle.

In one embodiment of the display device of the present application, the second support plate includes a lateral wall higher than the first portion.

In one embodiment of the display device of the present application, at least one groove corresponds to a position of the at least one first via hole and is defined in the first folding frame and the second folding frame, and the at least one pretension assembly is embedded in the at least one groove.

In one embodiment of the display device of the present application, the cover window includes transparent polyimide or polyethylene terephthalate.

In one embodiment of the display device of the present application, the display device of the present invention further includes a pivot assembly, the pivot assembly is connected to the first folding frame and the second folding frame.

In one embodiment of the display device of the present application, the display device further includes a pivot assembly, the pivot assembly includes at least one hinge and a protection cover, the pivot assembly includes at least one hinge and a protection cover, the at least one hinge is connected to the first folding frame and the second folding frame, and the protection cover covers the at least one hinge and part of the first folding frame and the second folding frame.

In one embodiment of the display device of the present application, the display device further includes a driving module, the driving module is electrically connected to the flexible display screen and controls the flexible display screen of the display device to display images.

In one embodiment of the display device of the present application, a plurality of holes are defined in the first support plate to form the bending structure, and the first support plate and the at least one second support plate includes one or more of metal, elastic material, flexible material, or composite material.

The present application further provides a display device, including: a first folding frame; a second folding frame rotating relative to the first folding frame; the first support plate disposed on the first folding frame and the second folding frame and including a bending structure, wherein the bending structure is connected to the first folding frame and the second folding frame; a plurality of second support plates disposed on two sides of the first support plate; a plurality of pretension assemblies connected to the second support plate; and a flexible display screen disposed on the first support plate and the plurality of second support plates and connected to the second support plates, wherein the plurality of pretension assemblies are configured to provide a pretension force to the flexible display screen.

In one embodiment of the display device of the present application, the plurality of pretension assemblies includes elastic elements, and the elastic elements generate the pretension force.

In one embodiment of the display device of the present application, the elastic elements are connected to the plurality of second support plates through a plurality of connection elements, and the plurality of connection elements penetrate a plurality of first via holes defined in the plurality of second support plates.

In one embodiment of the display device of the present application, the flexible display screen includes a cover window and a plurality of functional layers, the cover window covers a top surface of the plurality of functional layers, and the cover window is connected to the plurality of pretension assemblies.

In one embodiment of the display device of the present application, a plurality of second via holes are defined in the cover window, and the plurality of second via holes communicate to the plurality of first via holes, and the plurality of connection element penetrate the plurality of first via holes and the plurality of second via holes.

In one embodiment of the display device of the present application, the plurality of connection elements are pin nails, the elastic elements are springs, a first portion and a second portion are defined in the plurality of first via holes, a width and the first portion is less than a top portion of the at least one connection element, and a width of the second portion is greater than the top portion of the at least one connection element.

In one embodiment of the display device of the present application, the display device further includes a pivot assembly, the pivot assembly includes at least one hinge and a protection cover, the at least one hinge is connected to the first folding frame and the second folding frame, and the protection cover covers the at least one hinge and part of the first folding frame and the second folding frame.

A beneficial effect of the present application is to provide the pretension force to the display screen to reduce a chance of forming fold marks after flexible displays are bent a plurality of times and can improve flatness of a bending region of the screen.

DESCRIPTION OF SPECIFIC EMBODIMENTS OF THE INVENTION

Figure 1:
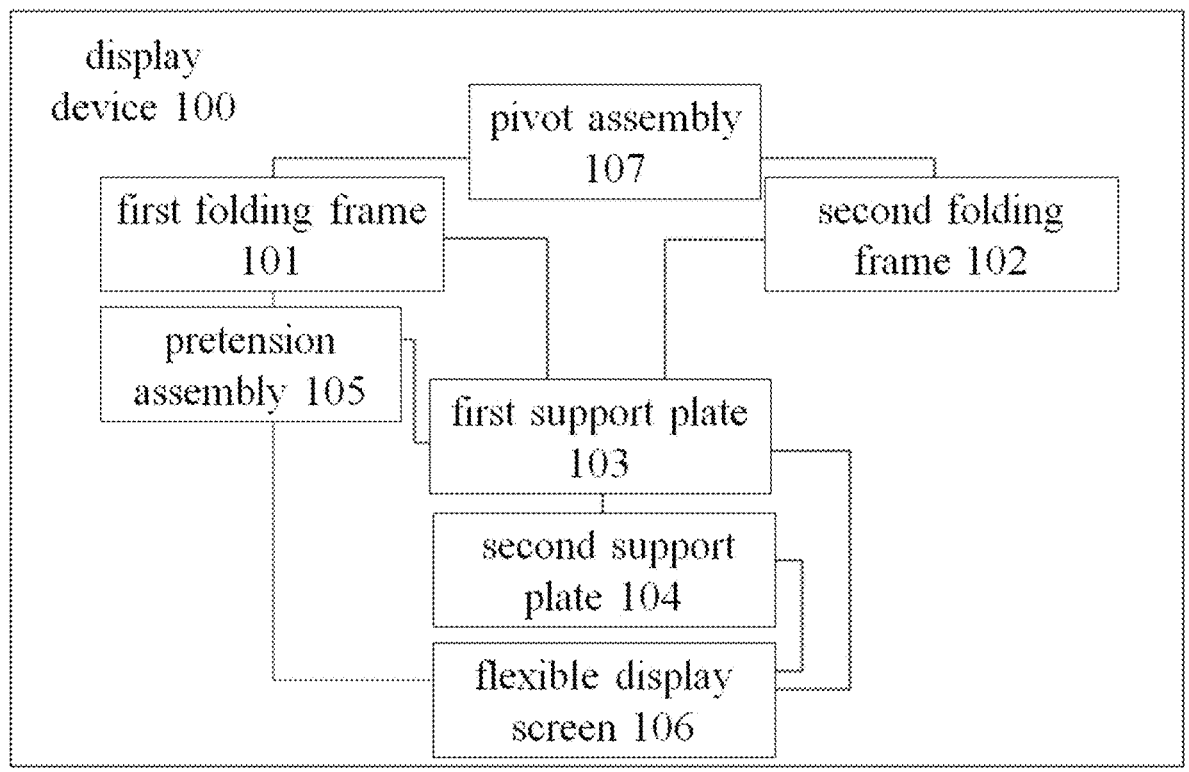
FIG. 1 is a block diagram of a foldable display device of one embodiment of the present application.

In order to allow the above and other purposes, features, and advantages of the present application to be more obvious and easier to understand, preferred embodiments of the present application will be particularly described hereinafter, and with reference to the accompanying drawings, a detailed description will be given below. Moreover, the directional terms of which the present application mentions, for example, "upper", "lower", "top", "bottom", "front", "rear", "left", "right", "inside", "outside", "side", "circumference", "center", "horizontal", "vertical", "axial", "radial", "top layer", "bottom layer", etc., only refer to directions of the accompanying figures. Therefore, the used directional terms are for illustrating and understanding the present application, but not for limiting the present application.

In the figures, units with similar structures are indicated by the same reference numerals.

Please refer to FIG. 1. A display device 100 of the present application includes a first folding frame 101, a second folding frame 102, a first support plate 103, a second support plate 104, a pretension assembly 105, a flexible display screen 106, and a pivot assembly 107.

Figure 2:
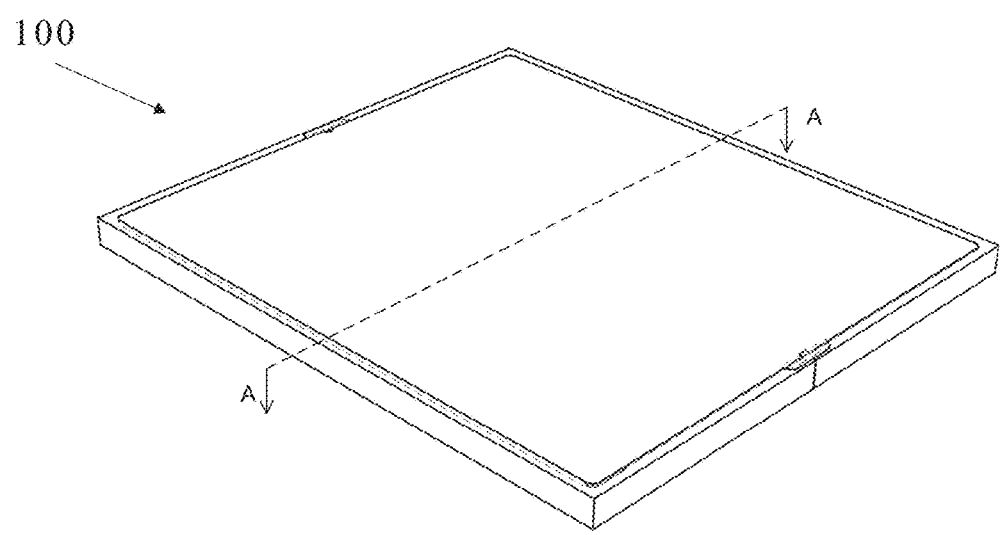
FIG. 2 is a first unfolding schematic diagram of the display device of one embodiment of the present application.
Figure 3:
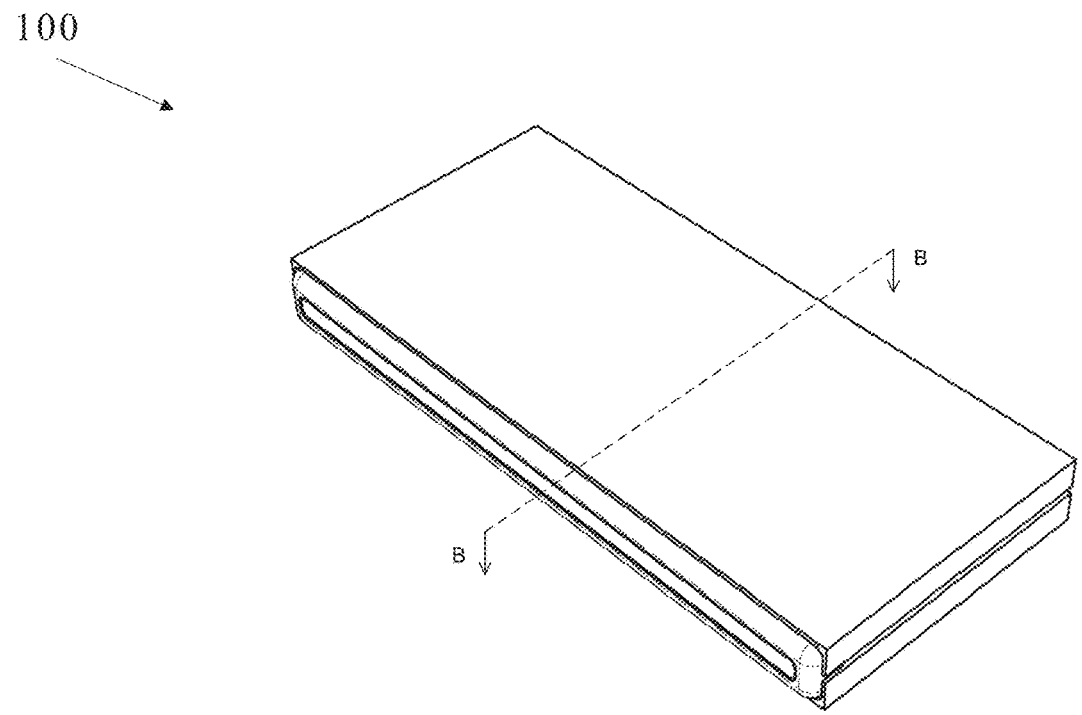
FIG. 3 is a first folding schematic diagram of the display device of one embodiment of the present application.

Furthermore, as illustrated in FIG. 2 to FIG. 14, the second folding frame 102 rotates relative to the first folding frame 101. Specifically, the second folding frame 102 and the first folding frame 101 are pivotally connected or hinged together. In one further embodiment, the display device of the present application further includes a pivot assembly 107. The pivot assembly 107 can be connected to the first folding frame 101 and the second folding frame 102. Therefore, by configuration of the first folding frame 101, the second folding frame 102, and the pivot assembly 107, the display device 100 can be folded or unfolded as illustrated in FIG. 2 and FIG. 3.

Figure 4:
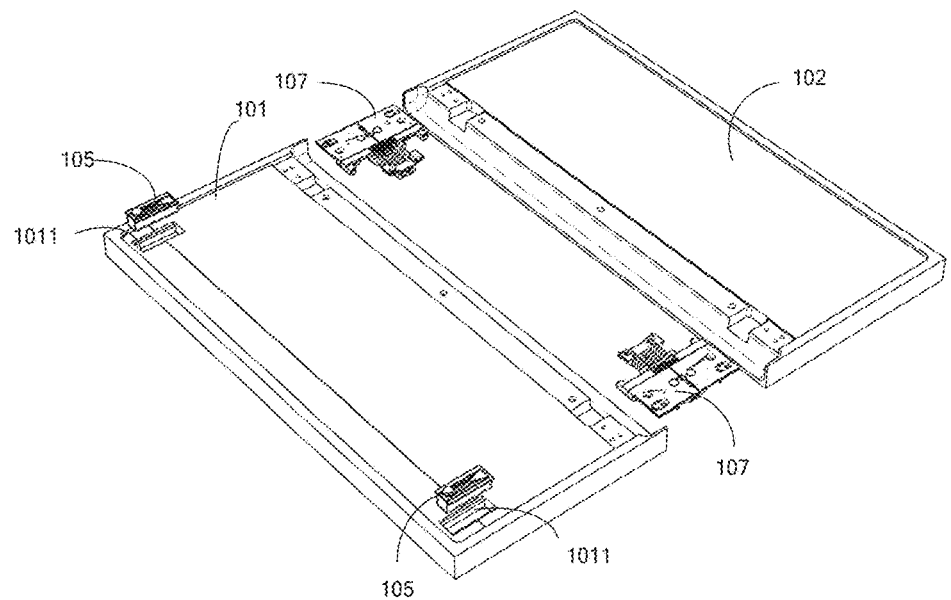
FIG. 4 is a first assembling schematic diagram of one embodiment of the present application.
Figure 11:
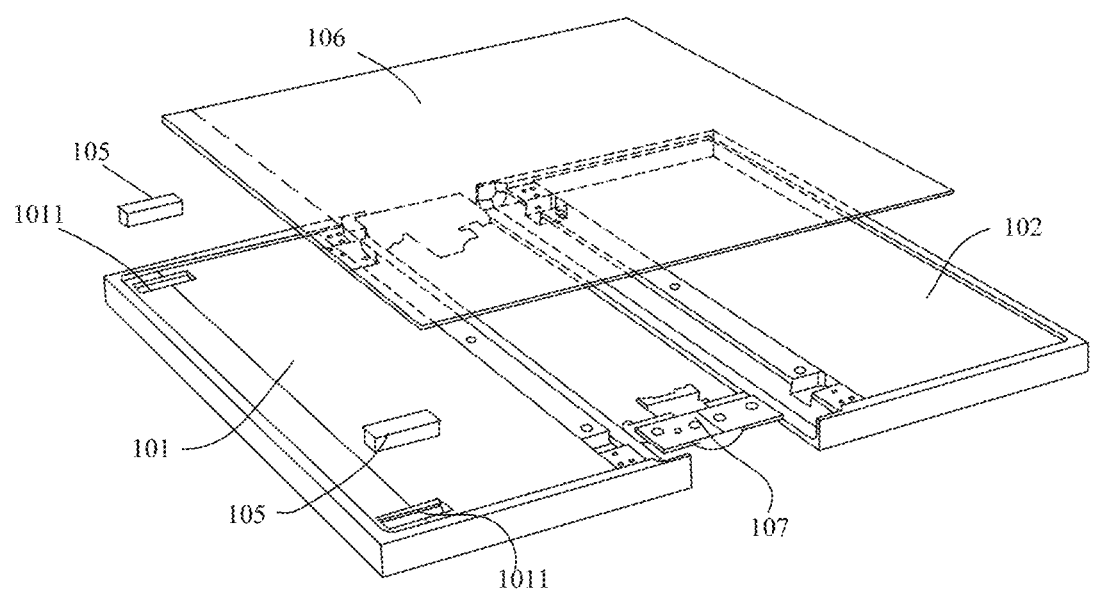
FIG. 11 is a fifth assembling schematic diagram of the display device of one embodiment of the present application.
Figure 12:
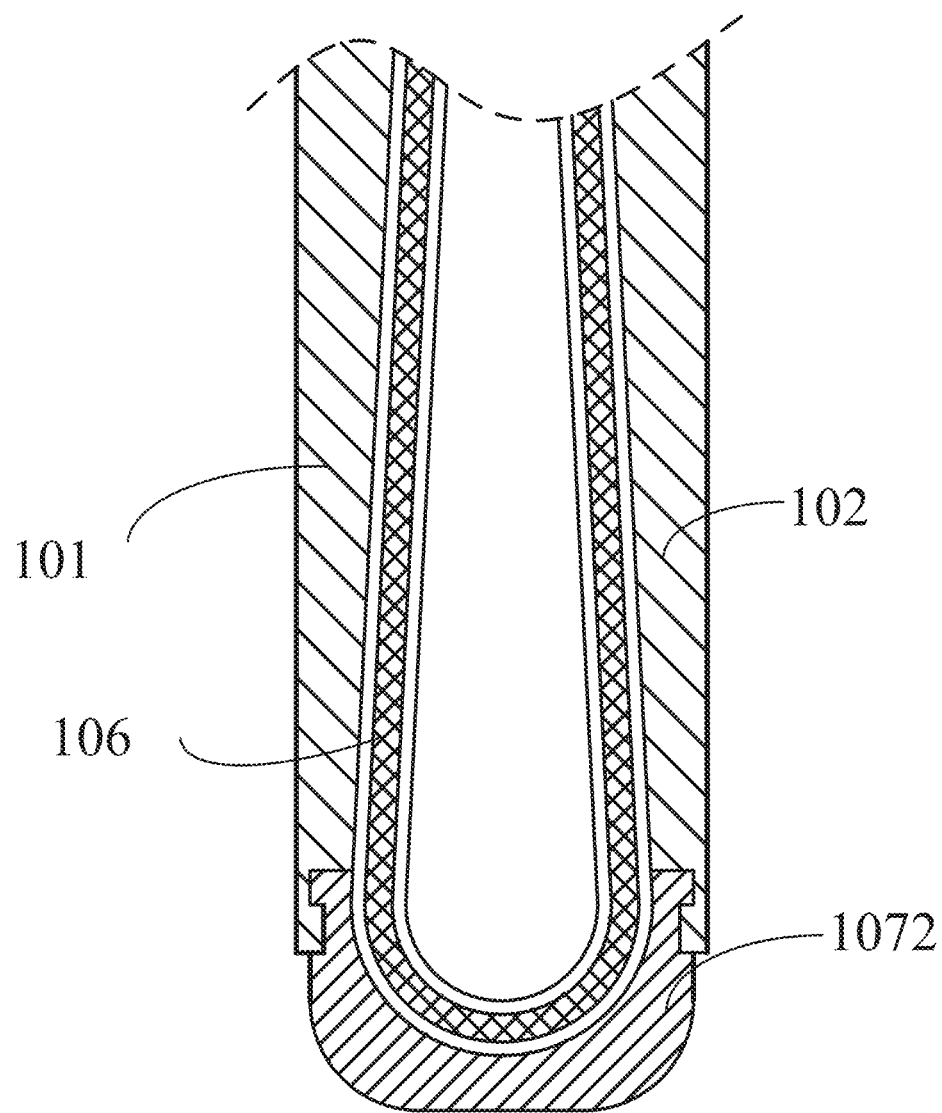
FIG. 12 is a second folding schematic diagram of the display device of one embodiment of the present application.
Figure 13:
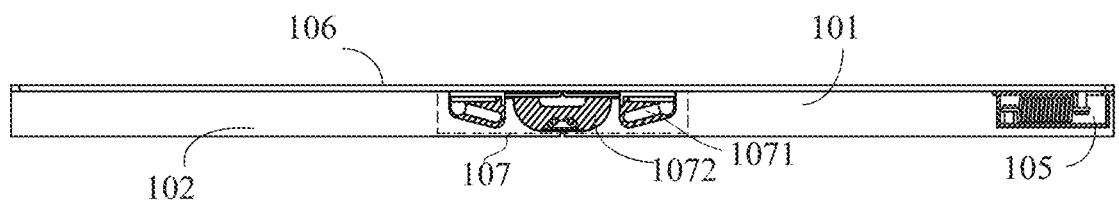
FIG. 13 is a second unfolding schematic diagram of the display device of one embodiment of the present application.

In one embodiment, as illustrated in FIG. 4, FIG. 11, and FIG. 13, the pivot assembly 107 includes at least one 1071 and a protection cover 1072. The at least one hinge 1071 is connected to the first folding frame 101 and the second folding frame 102. The protection cover 1072 covers the at least one hinge 1071 and part of the first folding frame 101 and the second folding frame 102 to protect the at least one hinge 1071 and part of the first folding frame 101 and the second folding frame 102, but are not limited thereto. The pivot assembly 107 can also include a gear, a rotating shaft, a damping mechanism, etc., which can be configured according to actual requirements.

As illustrated in FIG. 8 to FIG. 11, the first support plate 103 is disposed on the first folding frame 101 and the second folding frame 102 and includes a bending structure 1031. A position of the bending structure 1031 corresponds to a pivot position of the first folding frame 101 and the second folding frame 102. In one further embodiment, the plurality of holes are defined in the first support plate 103 to form the bending structure 1031 having a patterned mesh structure. The first support plate 103 is mainly used for ensure bending ability, support ability, and flatness of the flexible display screen 106.

Furthermore, in one embodiment, the first support plate 103 includes one or more of metal, elastic material, flexible material, or composite material. Specifically, the first support plate 103 can include stainless steel, and a patterning process and other processes can be performed on the first support plate 103 to form the bending structure 1031, but is not limited thereto.

In another embodiment, the bending structure 1031 can be made of one or more of elastic material, flexible material, or composite material, and other part of the first support plate 103 can be made of a metal, for example, made of a stainless steel to ensure stiffness and flatness of the display device 100.

As illustrated in FIG. 6 to FIG. 10, at least one second support plate 103 is disposed on at least one side of the first support plate 103, and at least one first via hole 1041 is defined in the at least one second support plate 104. In one embodiment, the second support plate 104 is disposed slidably on one side of the first support plate 103, but is not limited thereto. The second support plate 104 and the first support plate 103 can be configured according to structures of the first folding frame 101 and the second folding frame 102.

Furthermore, in one embodiment, the second support plate 104 includes one or more of metal, elastic material, flexible material, or composite material. Specifically, the second support plate 104 can include stainless steel.

Figure 8:
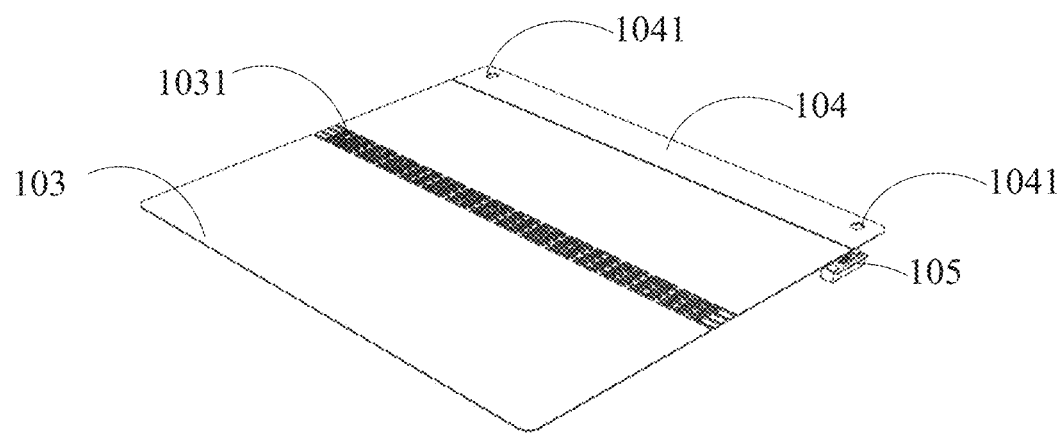
FIG. 8 is a second assembling schematic diagram of the display device of one embodiment of the present application.
Figure 9:
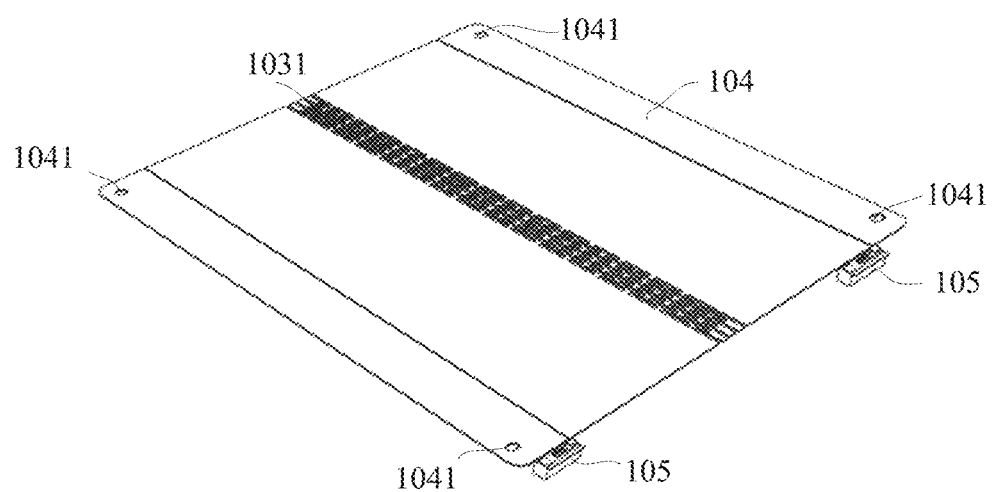
FIG. 9 is a third assembling schematic diagram of the display device of one embodiment of the present application.
Figure 10:
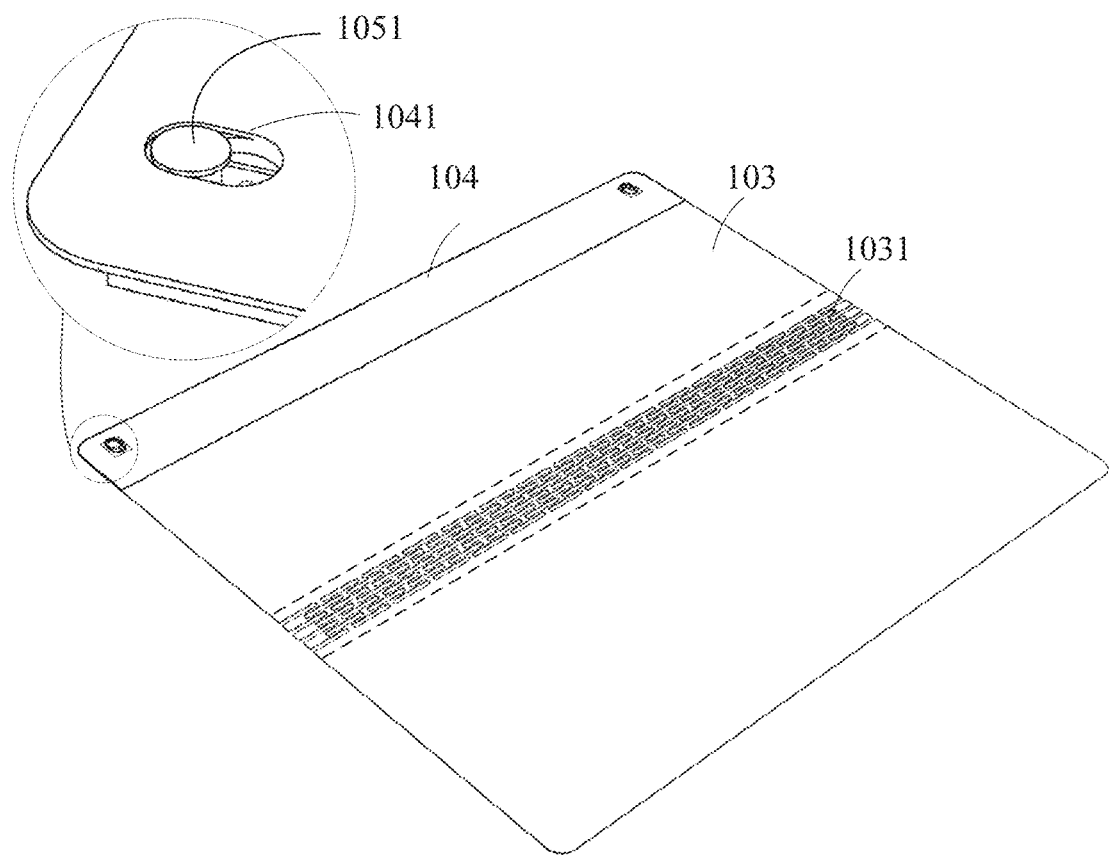
FIG. 10 is a fourth assembling schematic diagram of the display device of one embodiment of the present application.

As illustrated in FIG. 8 and the FIG. 10, there can only be one second support plate 104 disposed on one side of the first support plate 103. Also, there can be two second support plate 104 disposed on two sides of the first support plate 103 respectively as illustrated in FIG. 9, but is not limited thereto. A number and a disposing position of the second support plate 104 can be determined according to factors such as an area needed to be displayed, the structures of the first folding frame 101 and the second folding frame 102, etc.

Furthermore, if length of the flexible display screen 106 is relatively short, there can only be one second support plate 104 disposed on one side of the first support plate 103. However, if the length of the flexible display screen 106 is relatively long, under a situation without changing an area of the first support plate 103, another second support plate 104 can be added on another side of the first support plate 103.

The at least one pretension assembly 105 is configured to provide a pretension force to the flexible display screen 106. The at least one pretension assembly 105 is disposed between the first folding frame 101 and the at least one second support plate 104 and/or is disposed between the second folding frame 102 and the at least one second support plate 104. Specifically, as illustrated in FIG. 4 to FIG. 11 and FIG. 13 to FIG. 14, the at least one pretension assembly 105 can correspond to at least one first via hole 1041 and is disposed between the first folding frame 101 or the second folding frame 102 and the at least one second support plate 104.

In one embodiment, in FIG. 9, four pretension assemblies 105 correspond to four first via holes 1041, and in FIG. 11, two pretension assemblies 105 correspond to two first via holes 1041. Please refer to FIG. 13 and FIG. 14, it can be understood that the pretension assemblies 105 are disposed between the first folding frame 101 and the second support plate 104, but is not limited thereto.

In one embodiment, the pretension assemblies can also be disposed on the second folding frame 102. At this time, the second support plate 104 is disposed on the second folding frame 102. Therefore, the pretension assemblies 105 are disposed between the second folding frame 102 and the second support plate 104.

Figure 5:
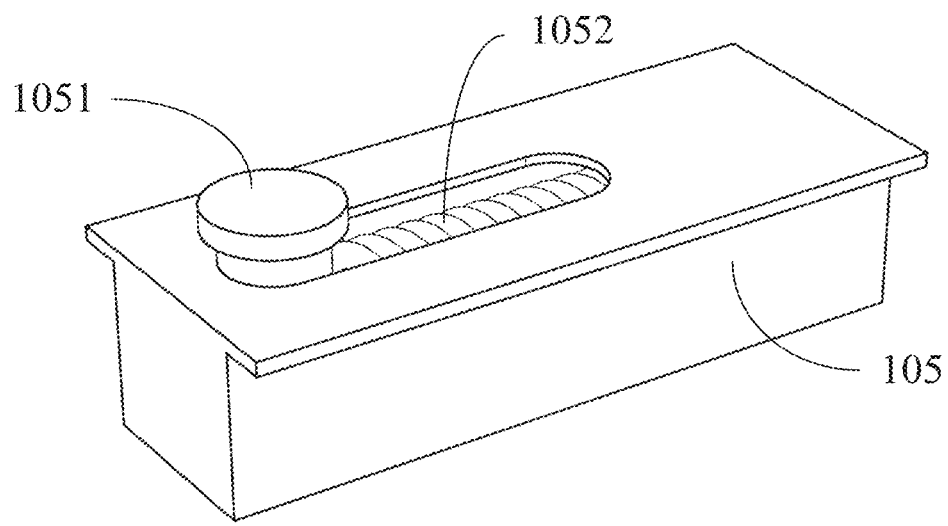
FIG. 5 is a schematic diagram of a pretension assembly of the display device of one embodiment of the present application.
Figure 14:
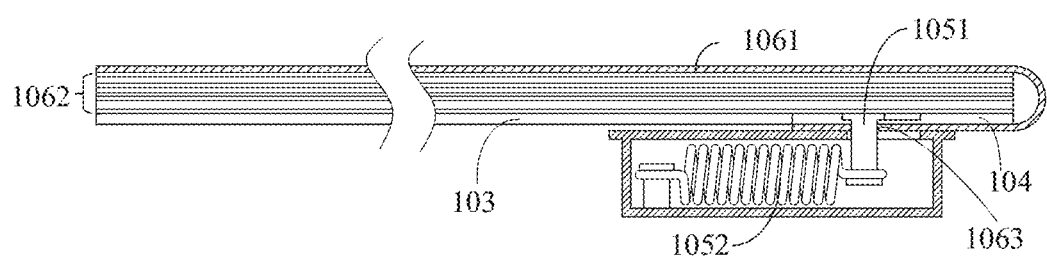
FIG. 14 is a schematic diagram of the display device of one embodiment of the present application.

Specifically, as illustrated in FIG. 5, FIG. 10, and FIG. 14, the pretension assembly 105 can include at least one elastic element 1052, and the elastic element 1052 can generate the pretension force. In one embodiment, the at least one elastic element 1052 is connected to the at least one second support plate 104 through at least one connection element 1051, and the at least one connection element 1051 penetrates at least one first via hole 1041 defined in the at least one second support plate 104. In other words, there can be a plurality of connection elements 1051 matched with one elastic element 1052; or there can also be the plurality of connection elements 1051 matched with the plurality of elastic elements 1052, which can be configured according to actual requirement.

After elements such as the first folding frame 101, the second folding frame 102 have been disposed completely, the flexible display screen 106 can be disposed on the first support plate 103 and the at least one second support plate 104, and the flexible display screen 106 is connected to the at least one connection element 1051.

In addition, as illustrated in FIG. 10, FIG. 13, and FIG. 14, the at least one connection element 1051 penetrates the at least one first via hole 1041, the at least one elastic element 1052 is connected to the at least one connection element 1051 and provides the pretension force toward one lateral side of the first folding frame 101 or the second folding frame 102 to the at least one connection element 1051. For example, as illustrated in FIG. 13 and FIG. 14, the elastic element 1052 provides pretension force toward one lateral side of the second folding frame 102 away from the first folding frame 101, but is not limited thereto.

In one embodiment, as illustrated in FIG. 14, the flexible display screen 106 includes a cover window 1061 and a plurality of functional layers 1062, the cover window 1061 covers a top surface and a lateral surface of the plurality of functional layers 1062 and a bottom surface of the at least one second support plate 104, and the plurality of functional layers 1062 can include a cathode layer, a light-emitting layer, and an anode layer. In addition, the flexible display 106 can be a flexible organic light-emitting transistor screen, and the cover window 1061 can include transparent polyimide, polyethylene terephthalate (PET) plastic, etc.

In one embodiment, as illustrated in FIG. 14, the cover window 1061 is connected to the at least one pretension assembly 105. Specifically, at least one second via hole 1063 is defined in the cover window 1061, the at least one second via hole 1063 communicate to the at least one first via hole 1041, and the at least one connection element 1051 penetrates the at least one first via hole 1041 and the at least one second via hole 1063, and the cover window 1061 is connected to elastic element 1052 through the connection element 1051. Furthermore, a number of the first via hole 1041 and the second via hole 1063 can be configured according to the connection elements 1051, which is not limited thereto.

In one embodiment, as illustrated in FIG. 14, after the second support plate 104 is attached to the cover window 1061 of the flexible display screen 106, the cover window 1061 of the flexible display screen 106 can be bent by 180°. During attaching, the cover window 1061 is applied the pretension force and is straightened, then a glued connection is performed. By this method, pretension force is always applied on the cover window 1061 of the flexible display screen 106 and its corresponding plurality of functional layers 1062 without affecting a load state of display device layers, thereby allowing an outer surface of the flexible display screen 106 to have good flatness.

Figure 6:
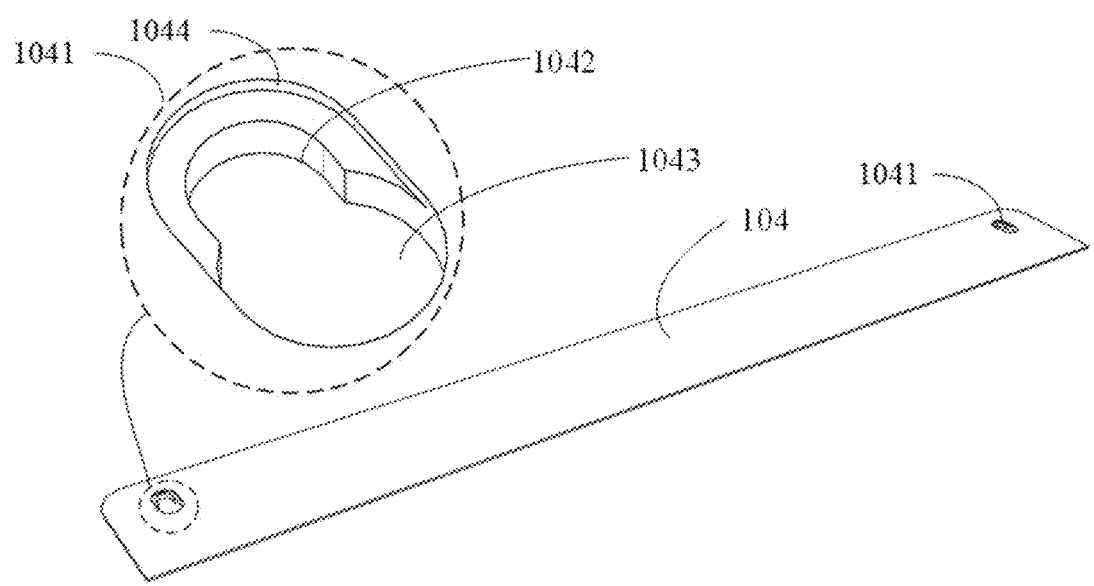
FIG. 6 is a first schematic diagram of a second support plate of the display device of one embodiment of the present application.
Figure 7:
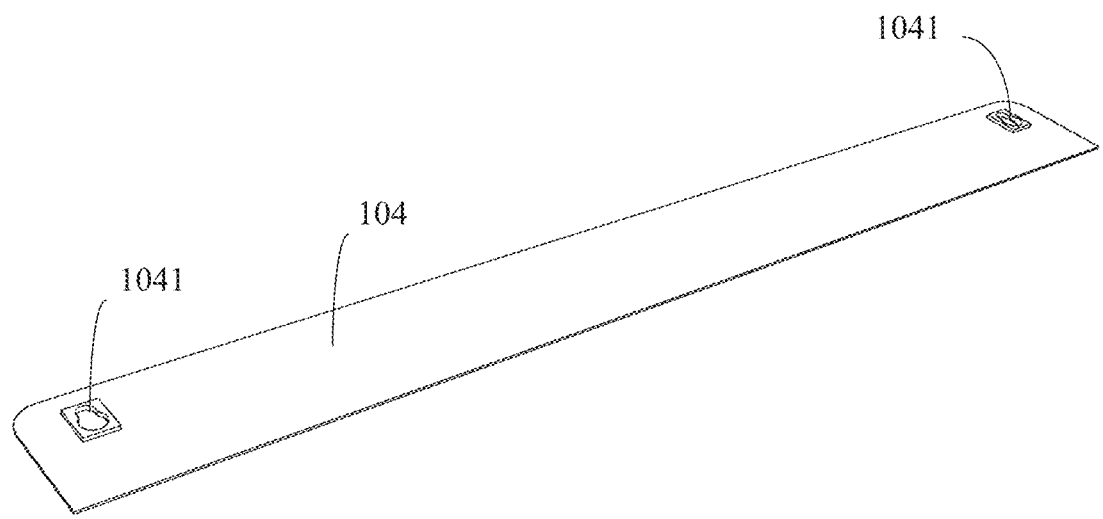
FIG. 7 is a second schematic diagram of the second support plate of the display device of one embodiment of the present application.

In one embodiment, the at least one connection element 1051 can be a pin nail, the at least one elastic element 1052 can be a spring, and a first portion 1042 and a second portion 1043 are defined in the at least one first via hole 1041. As illustrated in FIG. 6 and FIG. 10, a width and the first portion 1042 is less than a top portion of the at least one connection element 1051, and a width of the second portion 1043 is greater than the top portion of the at least one connection element 1051. Because the first portion 1042 is smaller than the top portion of the connection element 1051, the connection element 1051 can be fixed when moved to the first portion 1042. When the connection element 1051 is moved from the first portion 1042 to the second portion 1043, as a width of the second portion 1043 is greater than the top portion of the connection element 1051, disassembly of the connection element 1051 and the second supporting plate 104 is facilitated. In this embodiment, a shape of the at least one first via hole 1041 is two overlapped circles, but is not limited thereto. As long as the shape facilitating fixing the connection element 1051 to the first via hole 1041 should be included in the present application, for example, the first via hole 1041 can also be triangular.

In addition, in one embodiment, as illustrated in FIG. 6, the second support plate 104 further includes a lateral wall 1044 higher than the first portion 1042 to allow the at least one connection element 1051 to position against with, so as to increase a contact area between the connection element 1051 and the second support plate 104, which allows the connection element 1051 to apply more even force to the second support plate 104, being convenient for disassembly and maintenance and enhancing reliability of connection.

In one embodiment, as illustrated in FIG. 4, FIG. 6 to FIG. 8 and FIG. 10 to FIG. 11, at least one groove 1011 corresponds to a position of the at least one first via hole 1041 and is defined in the first folding frame 101 and the second folding frame 102, and the at least one pretension assembly 105 is embedded in the at least one groove 1011. Specifically, numbers and positions of the groove 1011 and the first via hole 1041 can be configured according to a number of the pretension assembly 105 or a number and a position of the connection element 1051. For example, if two connection elements 1051 are respectively disposed on the first folding frame 101 and the second folding frame 102, four first via holes 1041 are needed as illustrated in FIG. 9, and four grooves 1011 defined in the first folding frame 101 and the second folding frame 102 are also needed.

During an assembly process, an elastic stiffness range of the elastic element 1052 can be adjusted. For example, if the elastic element 1052 is a spring, a material of the spring can be selected, or a length of the spring can be adjusted to adjust the elastic stiffness range, so that a good pretension force can be maintained in the flexible display 106 during folding and unfolding, and the load state of the display device layer of the flexible display screen 106 is not affected. Therefore, failure of the module due to excessive external tension is avoided, thereby reducing a chance of forming fold marks after the flexible display screen 106 is bent a plurality of times, improving flatness of the bending region of the screen, and enhancing overall user experience of the flexible display screen 106.

Figure 15A:
FIGS. 15(a) and 15(b) are emulation diagrams of a flexible display screen of one embodiment of the present application
Figure 15B:
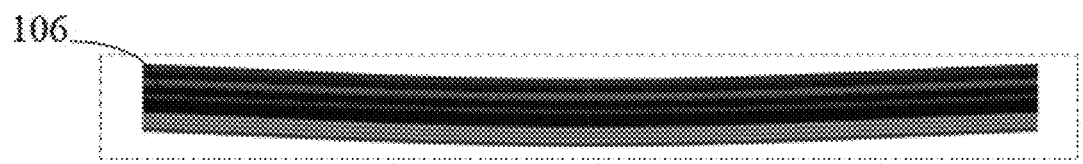

For example, as illustrated in FIG. 11, under a situation that there are two pretension assemblies 105, a maximum von mises stress of the flexible display 106 is 2.694e+02 N/m2 when folded, and it is 1.284+e01 N/m2 when unfolded. In addition, as illustrated in part (b) of FIG. 15, the flexible display screen 106 with the pretension assembly 105 after unfolded is smoother than the flexible display screen 106 without the pretension assembly 105 in part (a) of FIG. 15. Therefore, flatness of the flexible display screen 106 in part (b) of FIG. 15 is greater than the flexible display screen 106 in part (a) of FIG. 15.

A driving module 200 of the foldable display device 10 can be electrically connected to the flexible display screen 106 to control the flexible display screen 106 of the display device 100 to display images. The foldable display device 10 can be a foldable display device such as a mobile phone, a foldable screen, etc.

In summary, in the display device 100 of the present application, the bendable first support plate 103 and the second support plate 104 are respectively attached to the flexible display screen 106 to realize good support ability and a bendable function. In addition, the cover window 1061 of the outermost layer of the flexible display screen 106 is attached to the second support plate 104. By configuration of the first folding frame 101, the hinge 1071, and the second folding frame 102, the display device 100 can be folded into a wedge shape, and a thickness of the display device 100 after folding can be reduced, making the folding display device 10 to be carried and store easily. Furthermore, by configuration of the pretension assembly 105, a chance of forming fold marks after flexible displays are bent a plurality of times is reduced, which improves flatness of the bending region of the screen, thereby enhancing overall user experience of the flexible display screen 106.

Although the disclosure has been shown and described with respect to one or more implementations, equivalent alterations and modifications will occur to others skilled in the art based upon a reading and understanding of this specification and the annexed drawings. The disclosure includes all such modifications and alterations, and is limited only by the scope of the following claims. In particular regard to the various functions performed by the above described components (e.g., elements, resources, etc.), the terms used to describe such components are intended to correspond, unless otherwise indicated, to any component which performs the specified function of the described component (e.g., that is functionally equivalent), even though not structurally equivalent to the disclosed structure which performs the function in the herein illustrated exemplary implementations of the disclosure. In addition, while a particular feature of the disclosure may have been disclosed with respect to only one of several implementations, such features may be combined with one or more other features of the other implementations as may be desired and advantageous for any given or particular application. Furthermore, to the extent that the terms "includes", "having", "has", "with", or variants thereof are used in either the detailed description or the claims, such terms are intended to be inclusive in a manner similar to the term "comprising."

Which mentioned above is preferred embodiments of the present application, it should be noted that to those skilled in the art without departing from the technical theory of the present application, can further make many changes and modifications, and the changes and the modifications should be considered as the scope of protection of the present application.

What is claimed is:

1. A display device, comprising:
   a first folding frame;
   a second folding frame rotating relative to the first folding frame;
   a first support plate disposed on the first folding frame and the second folding frame and comprising a bending structure, wherein the bending structure is connected to the first folding frame and the second folding frame;
   at least one second support plate disposed on at least one side of the first support plate;
   at least one pretension assembly connected to the second support plate; and
   a flexible display screen disposed on the first support plate and the at least one second support plate and connected to the second support plate,
   wherein the at least one pretension assembly is configured to provide a pretension force to the flexible display screen, wherein the at least one pretension assembly is disposed between the first folding frame and the at least one second support plate or is disposed between the second folding frame and the at least one second support plate wherein the at least one pretension assembly comprises at least one elastic element, and the at least one elastic element generates the pretension force, wherein the at least one elastic element is connected to the at least one second support plate through at least one connection element, and the at least one connection element penetrates at least one first via hole defined in the at least one second support plate, wherein the at least one connection element is a pin nail, the at least one elastic element is a spring, a first portion and a second portion defined in the at least one first via hole, a width and the first portion is less than a top portion of the at least one connection element, and a width of the second portion is greater than the top portion of the at least one connection element.

2. The display device as claimed in claim 1, wherein the flexible display screen comprises a cover window and a plurality of functional layers, the cover window covers a top surface and a lateral surface of the plurality of functional layers and a bottom surface of the at least one second support plate, and the cover window is connected to the at least one pretension assembly.

3. The display device as claimed in claim 2, wherein at least one second via hole is defined in the cover window, and the at least one second via hole communicate to the at least one first via hole, and the at least one connection element penetrates the at least one first via hole and the at least one second via hole.

4. The display device as claimed in claim 1, wherein a shape of the at least one first via hole is two overlapped circles or a triangle.

5. The display device as claimed in claim 1, wherein the second support plate comprises a lateral wall higher than the first portion.

6. The display device as claimed in claim 1, wherein at least one groove corresponds to a position of the at least one first via hole and is defined in the first folding frame and the second folding frame, and the at least one pretension assembly is embedded in the at least one groove.

7. The display device as claimed in claim 2, wherein the cover window comprises transparent polyimide or polyethylene terephthalate.

8. The display device as claimed in claim 1, wherein the display device comprises a pivot assembly, and the pivot assembly comprises at least one hinge and a protection cover, the at least one hinge is connected to the first folding frame and the second folding frame, and the protection cover covers the at least one hinge and part of the first folding frame and the second folding frame.

9. The display device as claimed in claim 1, wherein the display device comprises a driving module, the driving module is electrically connected to the flexible display screen and controls the flexible display screen of the display device to display images.

10. The display device as claimed in claim 1, wherein a plurality of holes are defined in the first support plate to form the bending structure, and the first support plate and the at least one second support plate comprises one or more of metal, elastic material, flexible material, or composite material.

11. A display device, comprising:
    a first folding frame;

a second folding frame rotating relative to the first folding frame;

a first support plate disposed on the first folding frame and the second folding frame and comprising a bending structure, wherein the bending structure is connected to the first folding frame and the second folding frame;

a plurality of second support plates disposed on two sides of the first support plate;

a plurality of pretension assemblies connected to the second support plate; and a flexible display screen disposed on the first support plate and the plurality of second support plates and connected to the second support plates, wherein the plurality of pretension assemblies are configured to provide a pretension force to the flexible display screen, wherein the plurality of pretension assemblies comprise elastic elements, and the elastic elements generate the pretension force, wherein the elastic elements are connected to the plurality of second support plates through a plurality of connection elements, and the plurality of connection elements penetrate a plurality of first via holes defined in the plurality of second support plates, wherein the plurality of connection elements are pin nails, the elastic elements are springs, a first portion and a second portion are defined in the plurality of first via holes, a width and the first portion is less than a top portion of the at least one connection element, and a width of the second portion is greater than the top portion of the at least one connection element.

12. The display device as claimed in claim 11, wherein the flexible display screen comprises a cover window and a plurality of functional layers, the cover window covers a top surface of the plurality of functional layers, and the cover window is connected to the plurality of pretension assemblies.

13. The display device as claimed in claim 11, wherein the display device comprises a pivot assembly, the pivot assembly comprises at least one hinge and a protection cover, the at least one hinge is connected to the first folding frame and the second folding frame, and the protection cover covers the at least one hinge and part of the first folding frame and the second folding frame.

* * * * *